Sept. 10, 1957   E. J. HANKES   2,805,494
TEST SCORING APPARATUS
Filed Sept. 15, 1954
9 Sheets-Sheet 5

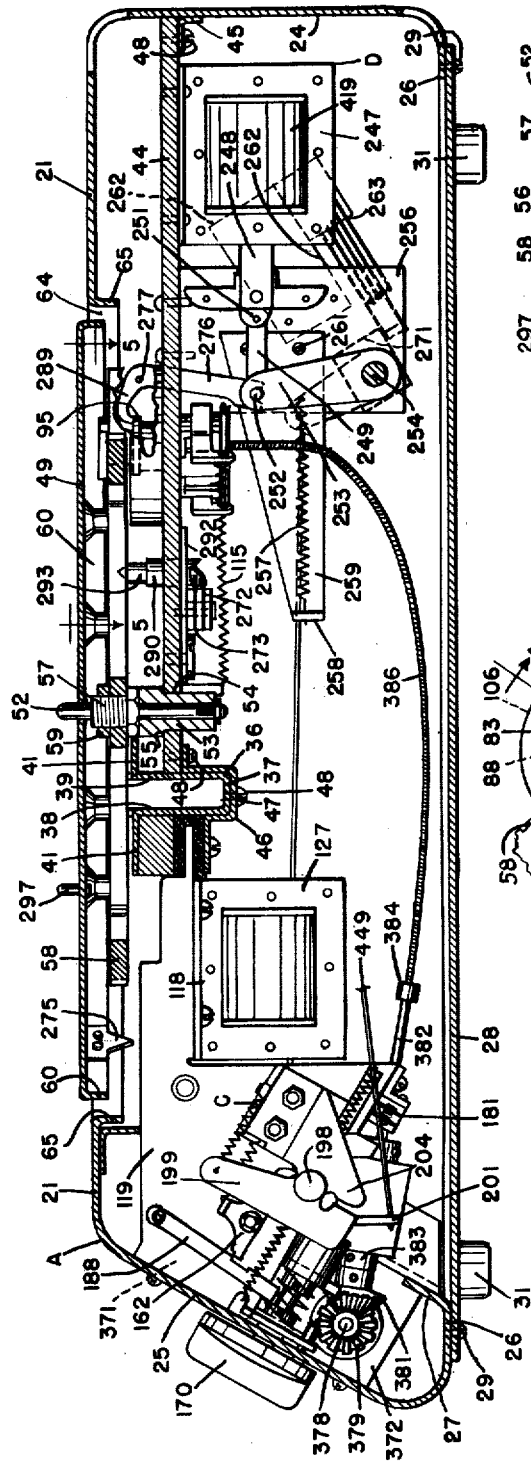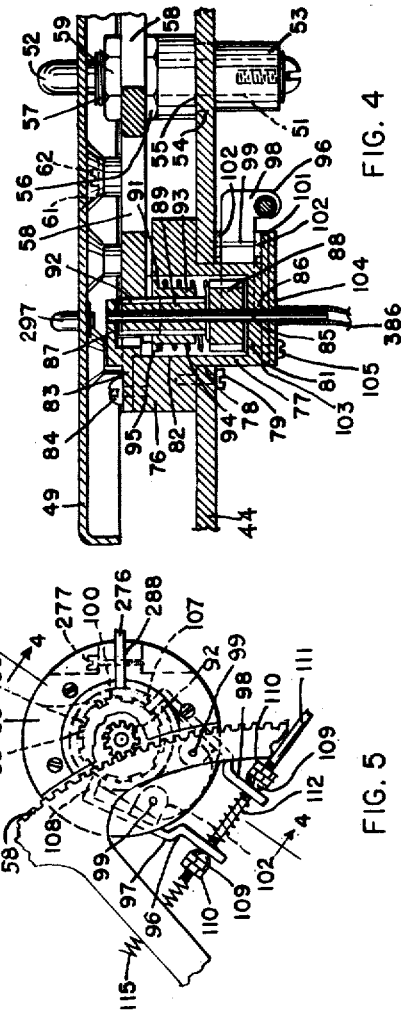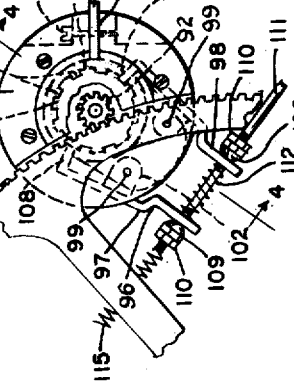

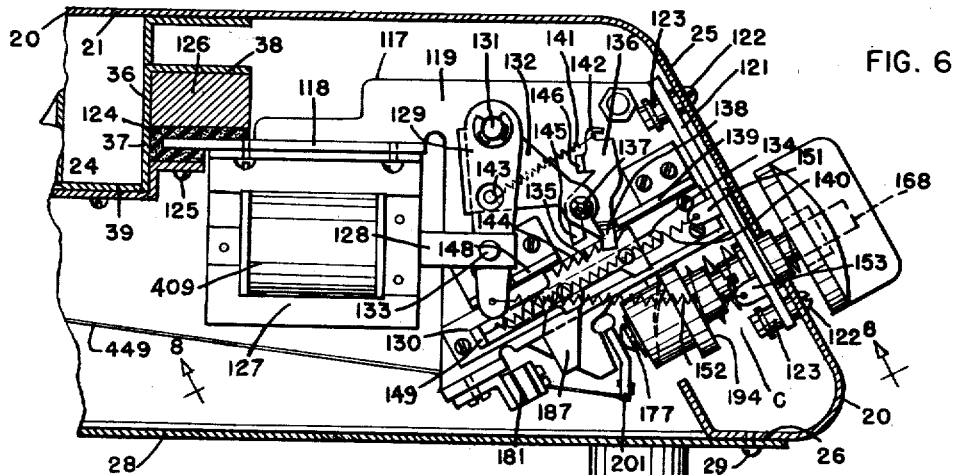
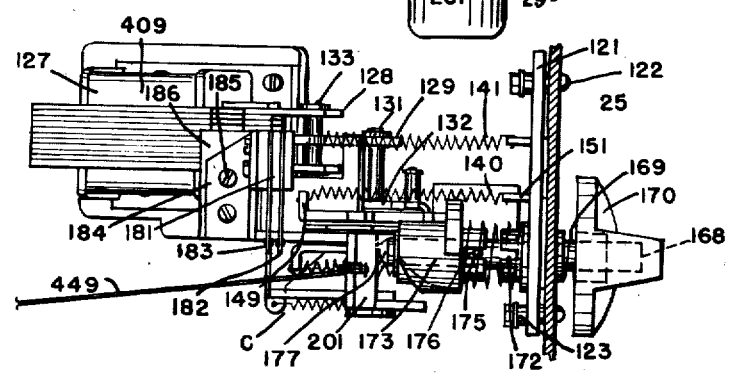
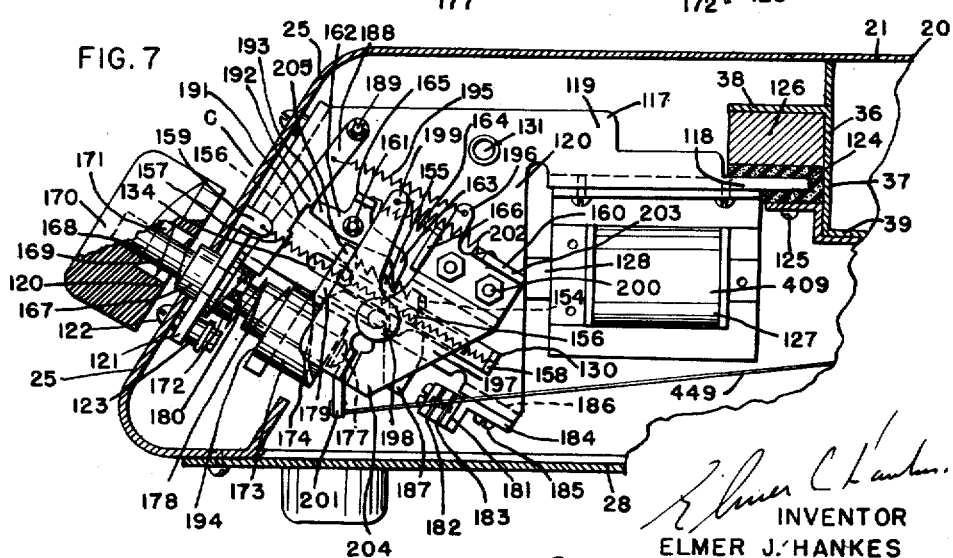

INVENTOR
ELMER J. HANKES
ATTORNEYS

Sept. 10, 1957   E. J. HANKES   2,805,494
TEST SCORING APPARATUS
Filed Sept. 15, 1954   9 Sheets-Sheet 6

INVENTOR
ELMER J HANKES
ATTORNEYS

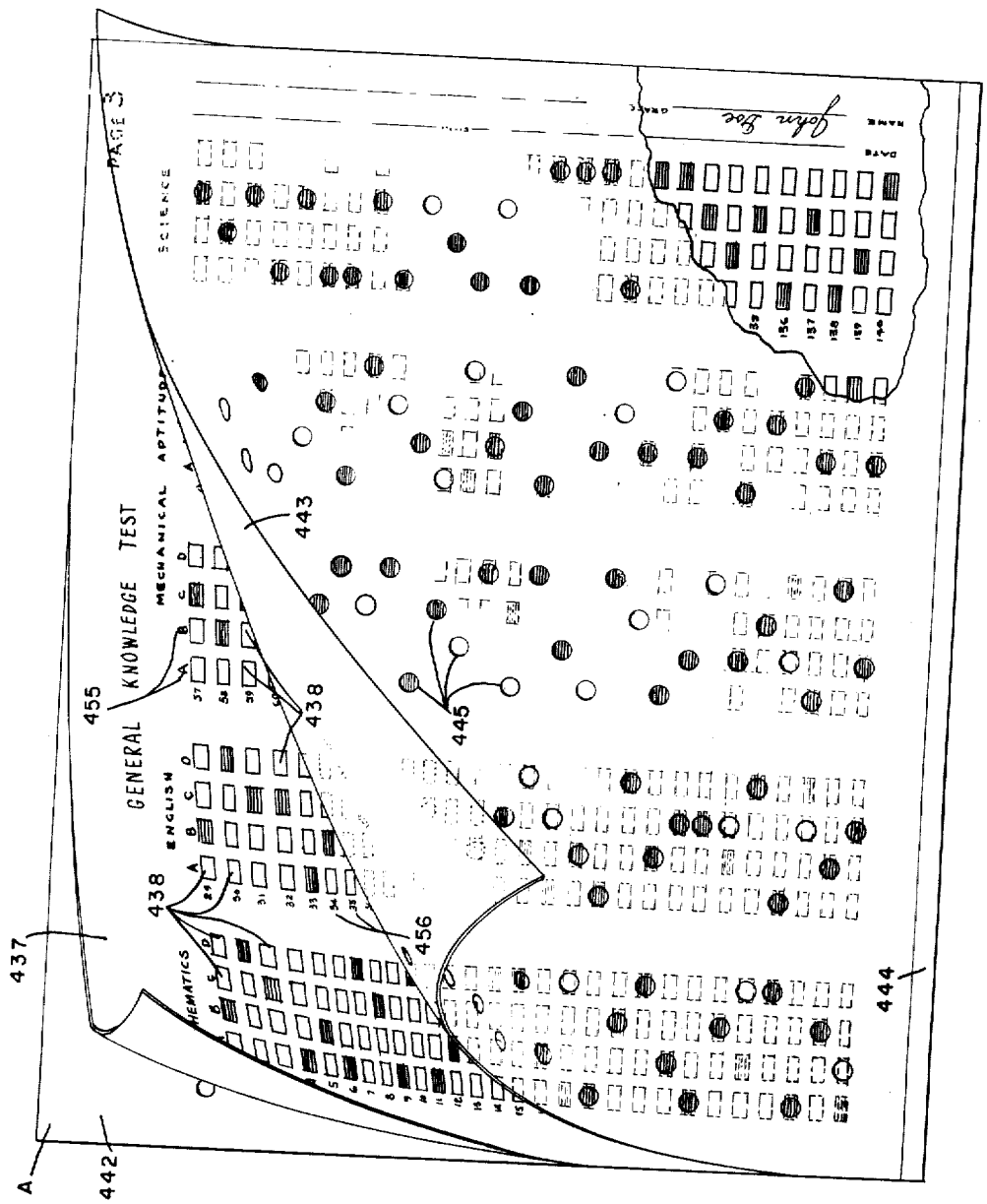

United States Patent Office 2,805,494
Patented Sept. 10, 1957

2,805,494

TEST SCORING APPARATUS

Elmer J. Hankes, Minneapolis, Minn.

Application September 15, 1954, Serial No. 456,251

13 Claims. (Cl. 35—48)

The herein disclosed invention relates to methods of test scoring for multiple choice tests and to apparatus to be used in conjunction therewith.

An object of the invention resides in providing a method in which fatigue of the operator is greatly reduced and in which the accuracy of the results is greatly increased.

An object of the invention resides in providing a method in which the answer sheet is marked as to correct and wrong answers and the result automatically recorded as the sheet is being marked.

Another object of the invention resides in providing a method in which a transparent colored mask is placed over the answer sheet, said mask having apertures opposite the mark spaces for the correct answers, in using a marker making a mark distinguishable from the student's mark and successively marking the answer sheet through the apertures where the student's marks occur, and in determining the number of correct answers thus marked by use of the apparatus of the invention or otherwise.

A still further object of the invention resides in providing a method for determining the wrong answers which consists in using a marker preferably making a mark distinguishable from either the student's mark or that of the correct answer marker and in marking the answer sheet through the apertures where the mark for the correct answer should appear in all cases where the student's mark for a particular question is in a space corresponding to a wrong answer and in determining the number of wrong answers by the apparatus of the invention or otherwise and in dividing the number of wrong answers by a predetermined divisor to procure a deductible wrong answer quotient and in subtracting said quotient from the number of correct answers by said apparatus or otherwise to procure the final score of the student.

An object of the invention resides in providing a method of test scoring for multiple choice tests in which a marker is used having a movable marking point adapted upon movement to actuate a counter.

Another object of the invention resides in providing a mask for use in test scoring in conjunction with the answer sheet and which is constructed of colored transparent material and formed with apertures therein opposite the mark spaces for the correct answers on the answer sheet and through the body of which the wrong answer marks are visible and readily distinguishable from the correct answer marks.

An object of the invention resides in providing apparatus utilizing a counter having a movable counting member movable in steps in forward and reverse directions, a first control device operating upon each actuation to give the counting member one step of movement in the forward direction and a second control device operating upon a predetermined number of actuations to give to said movable member one step of movement in the reverse direction.

Another object of the invention resides in providing a divider including a movable member movable in steps the second control device being associated with said divider and operating upon each actuation to give to said divider one step of movement and said divider giving to the counter one step of movement in the reverse direction when the divider has been operated a predetermined number of times.

A still further object of the invention resides in providing a selector for rendering one or the other of the control devices operative.

An object of the invention resides in providing a printer for printing the results of the test on the answer sheet.

Another object of the invention resides in providing a duplicator for controlling the number of copies made by the printer.

An object of the invention resides in providing a resetting device for resetting the counter to zero and for returning the various parts to normal position.

Other objects of the invention reside in the novel combination of parts, in the details of construction and in the combination of steps in the method as hereinafter illustrated and/or described.

In the drawings:

Fig. 3 is a longitudinal sectional view taken on line 3—3 of Fig. 2, and drawn to a greater scale.

Fig. 4 is a fragmentary elevational sectional view taken on line 4—4 of Fig. 2 and drawn to a greater scale.

Fig. 5 is a fragmentary plan sectional view of a portion of the structure shown in Fig. 3 and taken on line 5—5 of Fig. 3 and drawn to the same scale as Fig. 4.

Fig. 6 is an elevational sectional view taken on line 6—6 of Fig. 2 showing the divider of the invention and drawn to a still greater scale.

Fig. 7 is an elevational sectional view taken on line 7—7 of Fig. 2 and drawn to the same scale as Fig. 6.

Fig. 8 is an inverted plan sectional view taken on line 8—8 of Fig. 6.

Fig. 17 is a perspective view of one of the masks illustrating the application of an answer sheet thereto.

Figure 1:
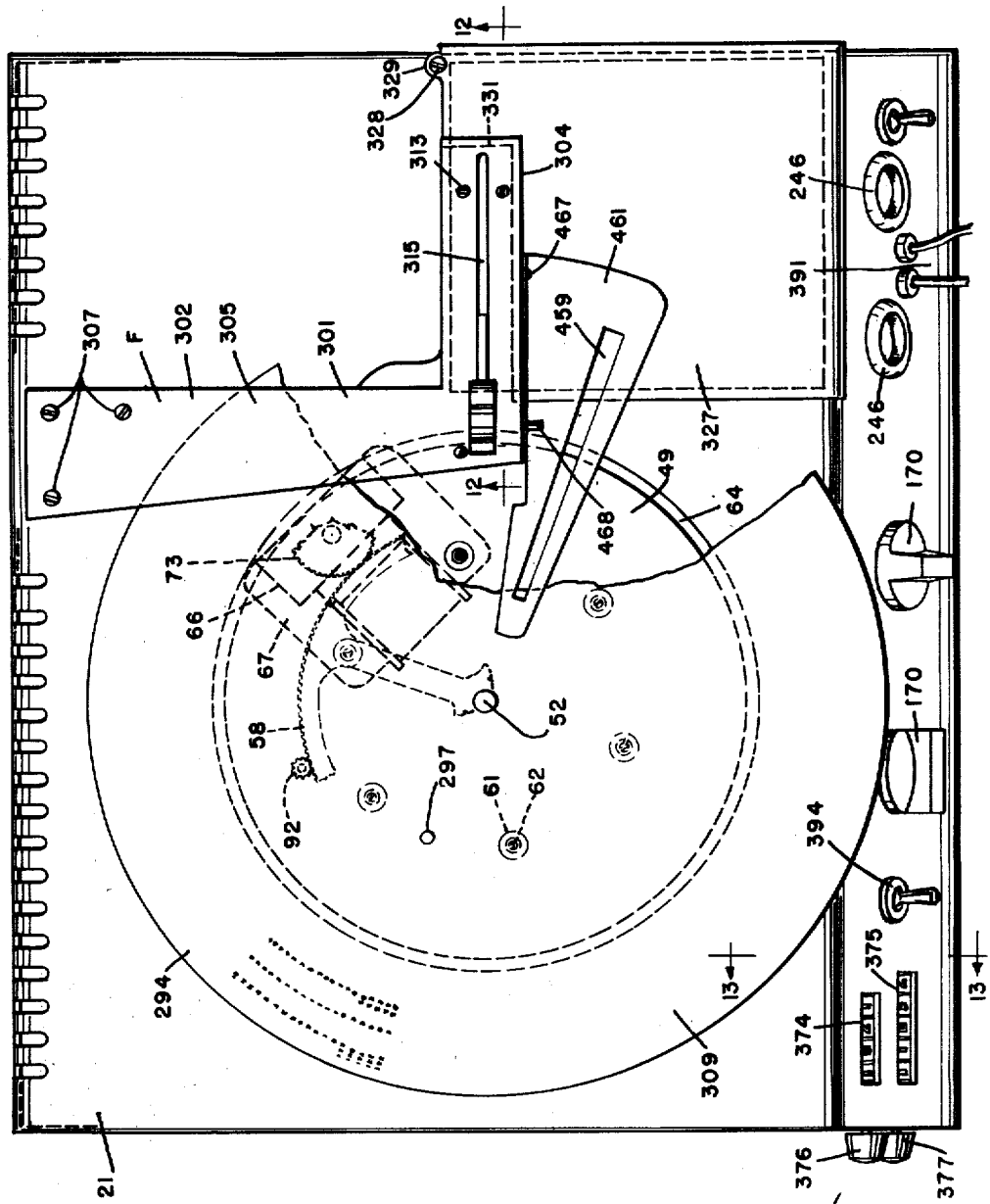
Fig. 1 is a plan view of a test scoring apparatus illustrating an embodiment of the invention.

The invention is used in tests of the multiple choice type. In such tests a pamphlet is provided for the student in which all of the questions are arranged in groups corresponding with the subject matter under consideration. Accompanying each question are a number of answers, usually four or more, one of which is correct and the others wrong. The student is required to select the proper answer. Each question is given a different number and the answers for each question usually are designated by letters, the same letters being used over again for different questions. The student is further given an answer sheet on which his choice of answers are to be noted. Several types of answer sheets may be used. In general these answer sheets have designated spaces there being one spaced to correspond with each of the listed answers for the various questions. The answer spaces have designations to correspond with the designation of the answers submitted in the test and the student places a mark on the space of the answer sheet which corresponds with the answer in the pamphlet which he believes is the correct answer to the question under consideration.

The invention utilizes a folder A which forms a mask and which is constructed of a transparent colored material. This mask is provided with a number of apertures adapted to register with the correct answer spaces of the answer sheet when the answer sheet is properly placed within the folder. The answer sheet is then examined through the apertures and marked with a suitable marking device such as a pencil and of a different color than that used by the student, such marks being made in all instances where the student's mark appears through the apertures. These marks are counted and preferably at the time of making the same. After all of the correct answers have been marked on the answer sheet through the apertures, the answer sheet is again examined but through the transparent body of the sheet to determine the wrong answers. A different mark is then placed on the answer sheet through the apertures for the particular questions considered and the total number of wrong answers counted. The final score is then determined in accordance with the marking system used.

The apparatus of the invention makes it possible to simultaneously mark the answer sheet, count the marks and determine the final score with a minimum of mental effort. The apparatus includes a counter B which has a turn table urged by an electric motor for rotation in either direction. An escapement allows the turn table to move a step at a time upon each actuation. Two pencils are used, one for right answers and one for wrong answers. Each includes a switch operated upon pressure on the lead of the pencil and which forms a control device for controlling the operation of the escapement. The right answer control device operates directly on the escapement and causes it to allow the turn table to move one step for each operation thereof. The wrong answer control device operates through a divider C to cause one step of movement of the turn table in the reverse direction upon a predetermined number of operations of the control device thereof. The number of operations of the wrong answers to procure one step of movement of the turn table in the reverse direction may be regulated at will. A selector E renders one or the other of the control devices operative and at the same time causes the motor to urge operation of the turn table in the proper direction. The result of the test may be printed on the answer sheet by means of a printer F or the same may be manually written on the sheet with a third pencil forming part of a third control device. This control device also has a switch closable upon applying pressure to the lead. A duplicator G similar in construction to the divider C permits of making any of a certain number of copies by the printer F. A resetting device D resets counter B to zero position and establishes normal relation of the parts. This resetting device may be operated by the printer F, the third control device, or manually if desired. The apparatus may be used in various different ways and in conjunction with various systems to perform functions not above enumerated and which will appear in connection with the detailed description thereof.

For the purpose of illustration it will be assumed that a test on a number of subjects is to be given and the student has been provided with a pamphlet listing the questions and the answers. The questions as to the various subjects and the answers will be arranged in groups and each question will be given a different number. Associated with each question will be four or more answers one of which is right and the others wrong. Each of these answers will be designated by a letter and the letters will be used over again for the answers to the various questions. Accompanying the pamphlet will be an answer sheet on which the choice of answers will be marked by the student. A typical answer sheet for such a test has been shown in Fig. 17 and is indicated by the reference numeral 437. This answer sheet has a number of outlined spaces 438 arranged in cross rows and in columns. The columns are arranged in groups corresponding to the subjects tested and there are as many columns in each group as the maximum number of answers given for any question on the subject corresponding thereto. The columns are headed by letters 455 which correspond with the designation of the answers in the pamphlet. Opposite each row of spaces is a number designated by the reference number 456 and which corresonds to the similarly numbered question in the pamphlet. In answering the question the student places a mark on the answer sheet in the proper row having the number corresponding to the number of the answer and in the column having the letter corresponding with the lettered answer in the pamphlet which he believes to be the right answer.

Used in conjunction with the answer sheet is a folder A. This folder has a back 442 and a front 443, the folder being provided with a hinge 444 connecting the front and back. This folder is of such a size as to snugly receive the answer sheet whereby the answer sheet may be correctly positioned with reference to the folder. The folder A is constructed of a transparent colored sheet of material and through the body of which the marks made in the answer spaces are clearly visible. In the face 443 of the folder which serves as a mask are provided apertures 445 which overlie the spaces 438 on the answer sheet corresponding to the right answers. The answer marks visible through these apertures are hence readily distinguishable from the marks visible through the body of the mask while both can readily be read.

The apparatus is mounted in a case 20 which is formed of sheet metal and which is provided with a top 21, side walls 22 and 23, a rear wall 24, and a front wall 25. The front wall 25 is arranged in a sloping manner as best shown in Figs. 3, 6 and 7. All of the walls of the case have inturned flanges 26 at the lowermost portions thereof and lying in a common plane. The flange 26 of front wall 25 is formed with an inwardly extending offset 27 and to which certain parts of the device are attached. A bottom 28 is attached to the flanges 26 by means of screws 29 which extend through said bottom and are screwed into said flanges. Rubber feet 31, similarly attached to the bottom 28, support the case 20 on the table or counter where the apparatus is to be used. Extending across the front and rear walls of the case 20 is a partition 32, channel-shaped in form, having a web 33 and flanges 34 and 35 extending outwardly therefrom. The flange 34 fits up against the top 21 while the flange 35 is flush with the flanges 26 of the front and rear walls 24 and 25. Extending across the wall 22 and the partition 32 is a beam 36 which is constructed of sheet metal and which is bent to provide a web 37 and two legs 38 and 39. The ends of these legs have formed thereon flanges 41 which extend outwardly therefrom and lying in a common plane and which are spaced from the top 21. These flanges terminate short of the side wall 22. At the end of the beam 36 are formed other flanges 42 which underlie the top 21. Also flanges 43, bent outwardly from the legs 38 and 39, overlie the end wall 22 and web 33 of partition 32. In the interior of the case 20 a wall structure including two walls 30 and 40 is employed, the wall 30 being attached to the end wall 23 of case 20 and the wall 40 being attached to the web 33 of partition 32 forming a compartment 50 within the case 20. All of the walls of the case and the partition and beam are welded together or may be secured together in any other suitable manner.

The counter B of the invention is mounted on a plate 44. This plate is spaced below the top 21, as best shown in Fig. 3, and is supported on an angle 45 secured to the rear wall 24 and to a U-shaped bar 46 which in turn is secured to the beam 36 by means of screws 47. Screws 48 extend through the plate 44 and are tapped into the angle 45 and the bar 46. The counter B further consists of a counting member in the form of a turn table 49 which is supported in the following manner: Axially disposed with reference to this turn table is a shaft 51 which has a center 52 extending through said turn table. This shaft is journaled for rotation in a bearing 53 which is pressed into an opening 54 in the plate 44. A shoulder 55 on said bearing holds the same in place. The shaft 51 has a collar 56 which rests on the upper end of the bearing 53. This collar is integral with the shaft. The portion of the shaft intermediate the center 52 and the collar 56 is formed with threads 57 and receives a gear wheel 58. A nut 59 screwed on the threads 57 clamps the gear wheel 58 against the collar 56. The turn table 49 is formed with depressions 61. Screws 62 extend through the said table with their heads disposed in the depressions 61. These screws are screwed into the gear wheel 58 and washers 63 between the turn table and said gear holds the turn table in proper relation with respect to the gear wheel. The turn table 49 is received in an opening 64 formed in the top 21. A lip 65 depending from said top stiffens and reinforces the same. The turn table 49 also has a lip 60 depending from the outer edge thereof.

The gear wheel 58 is urged in rotation in either direction by means of an electric motor 66. This motor has a field core 67 with a field winding 68 thereon. An armature, not shown, rotates between the legs of the core and is mounted on an armature shaft 69 journaled in suitable bearings attached to the core. The motor 66 is of the shaded pole type and has two shading windings 71 and 72 normally open and which when one or the other is shorted will cause the motor to travel in one direction or the other. Motors of this type being well known in the art and forming no particular feature of the instant invention, the motor shown has not been illustrated in detail, though it can readily be comprehended that any suitable reversible motor can be employed. The armature shaft 69 has mounted on it a gear 73 which meshes with the gear wheel 58. This gear, acting through the gear wheel 58, serves to urge the rotation of the turn table 49 in either direction depending upon which the windings 71 and 72 is shorted. The motor 66 is attached to the plate 44 by means of bolts 74 which extend through said motor and plate.

Through the action of the motor 66, the turn table 49 is driven in either direction by means of a transmission 75. This transmission is best shown in Figs. 4 and 5. Mounted on the plate 44 is a housing 76. This housing has a neck 77 which extends through an opening 78 in the plate 44. Screws 79 extend through the said plate and are screwed into the housing 76. The housing 76 is formed with a bore 82 which is closed at one end by means of an end wall 81. The other end of said bore is closed by means of a cap 83 which is attached to the housing 76 by means of screws 84. Extending along the bore 82 is a shaft 85 which is journaled in bearings 86 and 87 formed in the end wall 81 and in the cap 83. This shaft has secured to it near its lower end a ratchet wheel 88 and also one member 89 of a jaw clutch indicated in its entirety by the reference numeral 91. Rotatably mounted on the upper end of the shaft 85 is a pinion 92 which meshes with the gear wheel 58. The member 89 is identical in shape to the pinion 92. Slidably mounted on the member 89 is a sleeve 93 which has internal teeth engaging the teeth of the member 89 and the pinion 92. The sleeve 93 is urged into engagement with the pinion 92 by means of a compression coil spring 94 which is seated at one end against the ratchet wheel 88 and at its other end against a collar 95 formed on the sleeve 93. When the parts are in normal position, the gear 92 is connected to the shaft 85 and serves to rotate the same.

To operate the clutch 91 a lever 276 is employed which is received in a slot 288 in the housing 76. A screw 277 extends through this lever and is screwed into said housing and forms a pintle on which the lever may swing. The lever 276 has a finger 289 which engages the collar 95 on the sleeve 33 of said jaw clutch. As this finger is moved in a counter-clockwise direction, as shown in Fig. 3, the sleeve 93 is moved downwardly and the clutch disengaged to disconnect the pinion 92 from the escapement.

Figure 2:
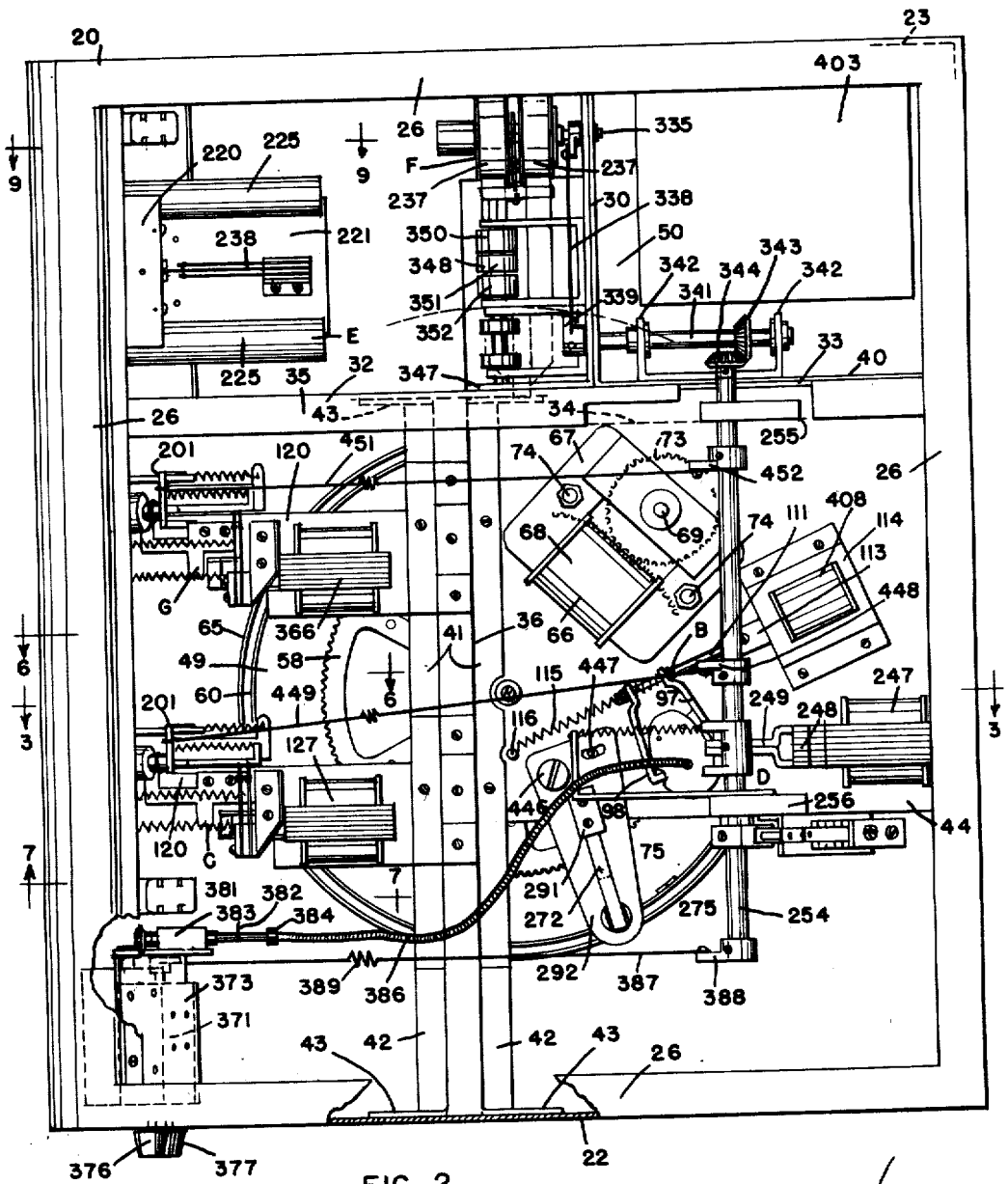
Fig. 2 is an inverted view of the structure shown in Fig. 1 with the bottom removed.

Operating in conjunction with the ratchet wheel 88 is an escapement 96 best shown in Figs. 2 and 5. This escapement consists of two levers 97 and 98, which are pivoted on pintles 99 extending through ears 102 on said levers and through a portion 101 of a plate 103 overlying the end wall 81 of housing 76 and into plate 44. A cover 104 overlying the plate 103 holds the pintles 99 in position. Both the plate 103 and cover 104 are attached to the end wall 81 by means of screws 105. The ratchet wheel 88 is formed with ratchet teeth 100 which are formed with notches 106 of the same width as the width of the teeth. The levers 97 and 98 are formed with pawls 107 and 108 which are adapted to engage in between the teeth 100. These pawls are of the same width as the notches 106 between the teeth 100 and the teeth and notches as well as the pawls 107 and 108 are spaced apart circumferentially a distance such that when one of the pawls is in one of the notches 106 and other pawl rests upon one of the teeth 100. By simultaneously reciprocating the levers 97 and 98, the pawls are caused to alternately engage the teeth and to allow the ratchet wheel to move by means of motor 66 in a step by step manner, one tooth at a time. A threaded rod 111 passes through the ends of two levers 97 and 98. Nuts 109 and lock nuts 110 are screwed on this rod and serve to limit the spacing of the pawls 107 and 108. A compression coil spring 112 disposed on the rod 111 between the levers 97 and 98 urges the ends of these levers against the nuts 109 and maintain them yieldingly in engagement therewith. The rod 111, as best shown in Fig. 2, it attached to the movable core 113 of an electro-magnet 114. This electromagnet is in the form of a solenoid which has a coil 408 which operates to draw the core 113 longitudinally into the same when the said electromagnet is energized. A spring 115 secured to the end of the rod 111 and to a spring anchor 116 attached to plate 44 serves to hold the core 113 in its outermost position as shown in Fig. 2 and with the pawl 107 of lever 98 disposed within one of the notches 106 between the teeth 100 and the pawl 108 of lever 97 riding on one of the teeth 100. When the electromagnet 114 is energized the rod 111 is drawn toward the right as shown in Fig. 2 and the pawl 107 of lever 98 is disengaged from the notch of the ratchet wheel 88. The motor 66 being energized moves the gear wheel 58 in one direction or the other. As the same moves, the pawl 108 of lever 98 drops into the adjacent notch 106. At such time the pawl 107 is free from the ratchet wheel and a tooth 100 on the same may move into position to be engaged by said pawl when the rod 111 is returned to normal position by spring 115.

For the purpose of determining the scores to be deducted due to wrong answers, the divider C is employed. This divider includes a sequential action 120 which consists of a frame 117 constructed from sheet metal and which is formed with a base 118. Issuing from this base is a flange 119 and extending outwardly from said flange at the forward portion of the same is a plate 121. The plate 121 underlies the front wall 25 of the case 20 and is secured thereto by means of bolts 122 which pass through said wall of the case and through rubber grommets 123 mounted in said plate. The base 118 is further received in a rubber mounting 124. This mounting is attached by means of a screw 125 to a bar 126 which is attached to the leg 38 of beam 36 and the flange 41 issuing therefrom by welding or otherwise. Mounted on the base 118 of frame 117 is an electromagnet 127 which has a movable core 128 movable longitudinally of the length thereof and a coil 409 for operating the same. A lever 129 is pivotally mounted on a stud 131 which is secured to the flange 119. This lever has an arm 132 which extends angularly outwardly therefrom. A pintle 133 passing through said lever and the end of the core 128 causes swinging movement of said lever and arm upon energization of the electromagnet 127. Slidably mounted in a slot 134 in the flange 119 is a tooth member 135. This tooth member is supported and guided as will be presently described. The tooth member 135 is urged toward the right as viewed in Fig. 6 by means of a spring 140 which is connected to a lug 149 on said tooth member and a lug 151 issuing from the plate 121. Lever 129 is urged toward the right by means of a spring 152 which is connected at one end to the lower end of the lever 129 and its other end to a lug 153 extending inwardly from the plate 121. Pivotally mounted on the end of the arm 132 by means of a pintle 137 is a lever 136. This lever has formed on it a finger 138 which engages a fulcrum 139 secured to the flange 119 of frame 117. A spring 141 is hooked on a hook 142 formed on the lever 136 and on a spring anchor 143 secured to the arm 132. This spring normally urges the finger 138 in engagement with fulcrum 139 and causes the lever 136 to rotate on the pintle 137 as the lever 129 is moved by the electromagnet 127. The tooth member 135 is constructed with teeth 144 which are adapted to be engaged by a pawl 145 on the lever 136. By means of this construction the pawl 145 is normally held spaced from the teeth 144 but as soon as the lever 129 is moved toward the left, as shown in Fig. 6, pawl 145 drops in behind one or the other of the teeth 144 and causes the tooth member 135 to move toward the left. Movement of the lever 136 is limited by means of a stop 146 which engages the edge of the arm 132. Movement of the lever 129 is terminated by engagement with a fixed abutment 148 attached to the flange 119 of frame 117.

On the opposite side of the plate 119, as viewed in Figs. 3 and 7, is disposed a tooth member 154 similar in construction to the tooth member 135, and which is formed with teeth 155 corresponding to the teeth 144 on tooth member 135. Two pins 156 extend through the slot 134 and are attached to both of said tooth members. These pins fit snugly within said slot and guide both tooth members for reciprocating movement. These toothed members constitute a slider indicated by the reference numeral 130. A spring 157 anchored at one end to a lug 158 on the end of the tooth member 154 and at its other end to a lug 159 issuing inwardly from the plate 121, urges the tooth member 154 for movement toward the lever as viewed in Fig. 7. By utilizing the two springs 157 and 140, the slider 130 is evenly moved toward the front of the apparatus and thus binding is prevented. Pivoted on a stud 161 issuing outwardly from the flange 119 is a lever 162. This lever has a dog 163 formed on it which is adapted to engage the teeth 155 of the tooth member 154. A spring 164 attached to a lug 165 on said lever and to another lug 166 formed on a bracket 160 urges the dog 163 into engagement with the teeth 155.

The tooth members 135 and 154 can be reset to normal position upon being operated a predetermined number of times within the range of the number of teeth formed thereon. This is accomplished by the following construction: Mounted in the plate 121 is a bearing 167 in which is rotatably mounted a shaft 168. The bearing extends through the front wall 25 of the case 20 and the shaft 168 extends outwardly beyond the same and has mounted on it a knob 170. A compression coil spring 169 encircles the protruding end of shaft 168 and is received within a depression 171 in the knob 170. The inner end of the bearing 167 is formed with notches 172 which are engageable with a pin 180 on shaft 168 and which serve to lock the shaft 168 from rotation. Slidably mounted on the inner end of the shaft 168 is a cam 173 having a spiraling cam surface 174. This cam is held from rotation by means of a pin 175 attached to the shaft 168 and which is received within a slot 176 formed in said cam. A head 177 on the end of shaft 168 limits endwise movement of the said cam. The cam 173 is urged toward the head 177 by means of a compression coil spring 178 which encircles the inner end of the bearing 172 and the shaft 168 and which bears against the said cam and the bearing 167. Engageable with the cam surface 174 of cam 173 is a finger 179 which extends downwardly from the tooth member 154 in the path of movement of said cam surface. The cam surface 174 is so designed that when the pin 180 lodges in any of the notches 172 a predetermined number of the teeth of the tooth members 154 and 135 may be engaged by the dog 163 and the pawl 145. Thus the number of movements of the said tooth members may be determined by the proper setting of the knob 170.

The divider C includes a switch 181, best shown in Fig. 8. This switch consists of two flexible contact arms 182 and 183 mounted on a bracket 184 and insulated therefrom and from one another. This bracket is attached by means of screws 185 to a lug 186 issuing outwardly from the flange 119. This switch is normally open and is adapted to be closed by means of an insulating finger 187 attached to the tooth member 135 by means of the pins 156. When the tooth members reach the end of their movement away from the front of the case, the finger 187 engages the contact arm 183 and moves the same into contact with the contact arm 182 completing the circuit through the switch.

For the purpose of releasing the slider 130 after switch 181 has been closed, an arm 188 is employed which is pivoted on a stud 189 issuing outwardly from the flange 119 of frame 117. This arm is formed with a recess 191 which provides a shoulder 192 adjacent the same. A finger 193 on the lever 162 normally engages said shoulder and when in such position the dog 163 is engageable with the teeth 155 of the tooth member 154. When, however, the finger 193 drops into the recess 191 the dog is raised free from the teeth 155. The extreme end of arm 188 is engageable with a shoulder 194 on the cam 173. Arm 188 is urged toward the finger 193 of lever 162 by means of a spring 195 secured at one end to said lever and at its other end to a lug 196 issuing from the bracket 160. The tooth member 154 is formed with a raised cam 295 which is adapted to engage the dog 163 when said toothed member reaches the end of its movement in the direction of the front 25 of case 20. Mounted on the flange 119 is another bracket 197. Two bolts 200 secure both the brackets 160 and the bracket 197 to the flange 119. The bracket 197 has a rivet 193 secured to it and which forms a bearing for a lever 199. This lever has an arm 201 depending downwardly from it and which is engageable with the head 177 on shaft 168. This lever is moved in a manner to urge the arm 201 into engagement with said head by means of a spring 202 which engages a lug 203 formed on the bracket 160 and the end of said lever. Movement of the lever 199 is limited by means of a stop 204 on the bracket 197 which engages the arm 201.

Figure 13:
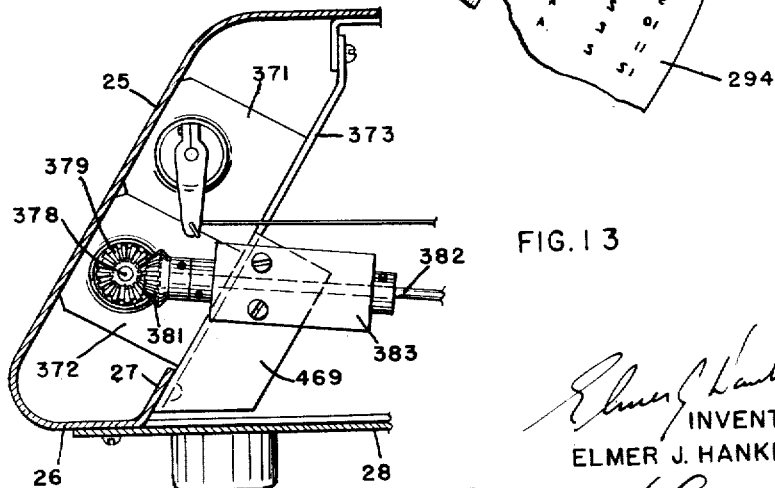
Fig. 13 is a sectional view taken on line 13—13 of Fig. 1.

For operating the apparatus, two control devices 206 and 207 are employed which are used to mark the answer sheet and to actuate the counter. These two control devices are identical in construction and consist of devices readily available on the market, and well known in the art. For this reason the said devices have only been shown diagrammatically in Fig. 13. The device 206 is in the form of a pencil having a barrel 208 with a lead 209 projecting outwardly therefrom. This lead is attached to a holder 211 which is slidably mounted in the barrel 208 and is adapted, when pressure is applied to the end of the lead, to close a control switch 212 carried by the barrel 208. The switch 212 has a fixed contact 213 and a movable contact 214 adapted to be closed when the holder 211 is moved by the lead 209 inwardly into the pencil. The control device 207 is similarly constructed and the description thereof will not be repeated, the corresponding parts being designated by the same reference numerals having the suffix A applied thereto.

Figure 10:
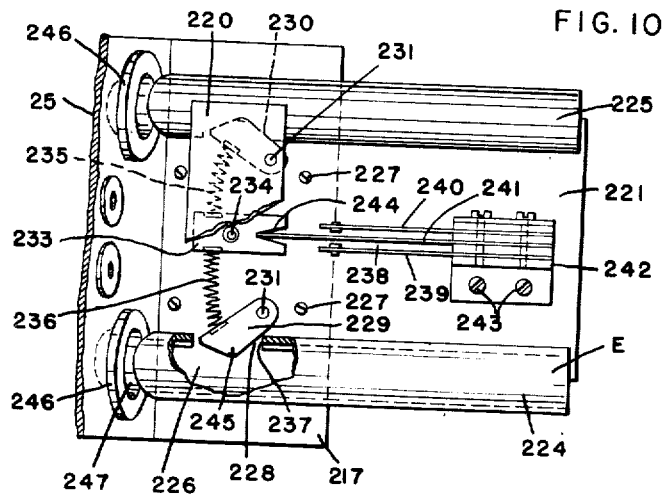
Fig. 10 is an inverted sectional view taken on line 10—10 of Fig. 9 and drawn to the same scale as Fig. 9.
Figure 9:
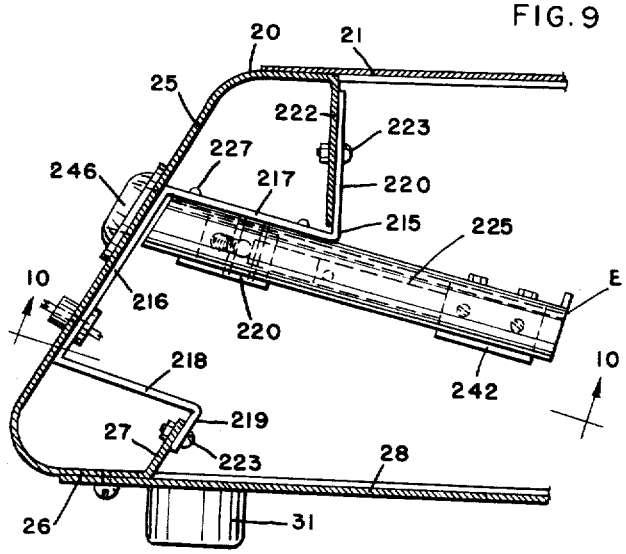
Fig. 9 is a view similar to Fig. 7 taken on line 9—9 of Fig. 2 and drawn to the same scale as Fig. 7 and illustrating the selector of the invention.

The two control devices 206 and 207 are normally associated with the selector E which is shown in detail in Figs. 9 and 10. This selector is mounted on a bracket 215 which has a portion 216 underlying the front wall 25 of the case 20. This portion has two arms 217 and 218 issuing outwardly therefrom and which terminate in flanges 219 and 220. Flange 219 overlies the offset 27 of case 20 while flange 220 overlies a lug 222 bent inwardly from the top 21 of said case. These parts are secured together by means of bolts 223. Underlying the arm 217 of bracket 215 is a plate-like member 221 which has the lateral edges of the same rolled to form two tubular sheaths 224 and 225. This plate-like member is secured to the arm 217 by means of rivets 227. These sheaths have bores 226 of a diameter to snugly receive the control devices 206 and 207. Registering with the bores 226 of the sheaths 224 and 225 are two escutcheons 246 which have openings 247 in the same coaxially disposed with reference to the said bores. These escutcheons tend to direct the control devices into the said bores. In the forward ends of the two sheaths 224 and 225 are formed recesses 228 and in which are disposed two levers 229 and 230 which are pivoted on studs 231 secured to the plate-like member 221 and to a strap 220 secured to the sheaths 224 and 225. Intermediate the levers 229 and 230 is another lever 233 which is pivoted on a stud 234 and also mounted in the same manner. Two compression coil springs 235 and 236 act between the levers 229 and 230 and the lever 233 and tend to maintain the lever 233 in a central position. The levers 229 and 230 are urged by the springs 235 and 236 into engagement with the edges 237 of the sheaths 224 and 225 at the inner ends of the recesses 228. The ends of the levers 229 and 230 are formed with cams 245 which are adapted to be engaged by the respective control devices when the same are inserted into the sheaths 224 and 225. These cams move the levers 229 and 230 outwardly from the sheaths 224 and 225 when one or the other of the control devices are inserted into its sheath. If both control devices are inserted at the same time the lever 233 remains in its central position. Cooperating with the lever 233 is a switch 238 which comprises two fixed spring contact arms 239 and 240 and a movable contact spring arm 241 disposed therebetween. These arms are carried by a mounting 242 secured to the plate-like member 221 by means of screws 243 and are insulated from one another and from the said plate-like member. The arm 241 extends outwardly beyond the arms 239 and 240 and the end of the same is received in a V-shaped notch 244 in the lever 233. It will thus be readily comprehended that when the arm 241 is moved to one side the circuit through arm 239 is closed and when moved to the other side the circuit through the arm 240 is closed. The springs 235 and 236 are evenly balanced so that the lever 233 is normally maintained in a central position as shown in Fig. 10.

For the purpose of resetting the turn table 49 and for performing similar functions with other parts of the apparatus, the resetting device D is employed. This device utilizes an electromagnet 247, similar to the electromagnet 114, which has a movable core 248 similar to the core 113 and a coil 419. This core has pivotally secured to the end of it a link 249 by means of a rivet 251. The other end of the link 249 is pivoted on a stud 252 attached to a lever 253. Lever 253 is secured to a shaft 254, best shown in Fig. 2, and which is mounted for rotation in bearings 255 and 256 secured to the underside of the plate 44 of case 20. A tension coil spring 257, attached at one end to said lever and at its other end to a lug 258 on a bracket 259, urges the spring in a manner to draw the core 248 to its outermost position. Bracket 259 is attached to the bearing 256 by means of screws 261.

Attached to the bearing 256 by means of a bracket 262 is a resetting switch 263. This switch has three fixed contact arms 264, 265 and 266. Operating in conjunction with the arm 264 is a movable contact arm 267 and operating between the arms 265 and 266 is a movable contact arm 268. The movable arms 267 and 268 are tied together through an insulated connector 269 so that the same move in unison. The switch formed between the arms 264 and 267 is normally open, that formed between arms 268 and 265 normally closed, and that formed by the arms 268 and 266 normally open. The movable arms are operated by means of a finger 271 which is rigidly secured to shaft 264. When the electromagnet 247 is energized, the core 248 of the same is drawn into the core structure of the magnet and the shaft 254 swung sufficiently to reverse the opening and closing of the circuits through the switch 263.

Figure 14:
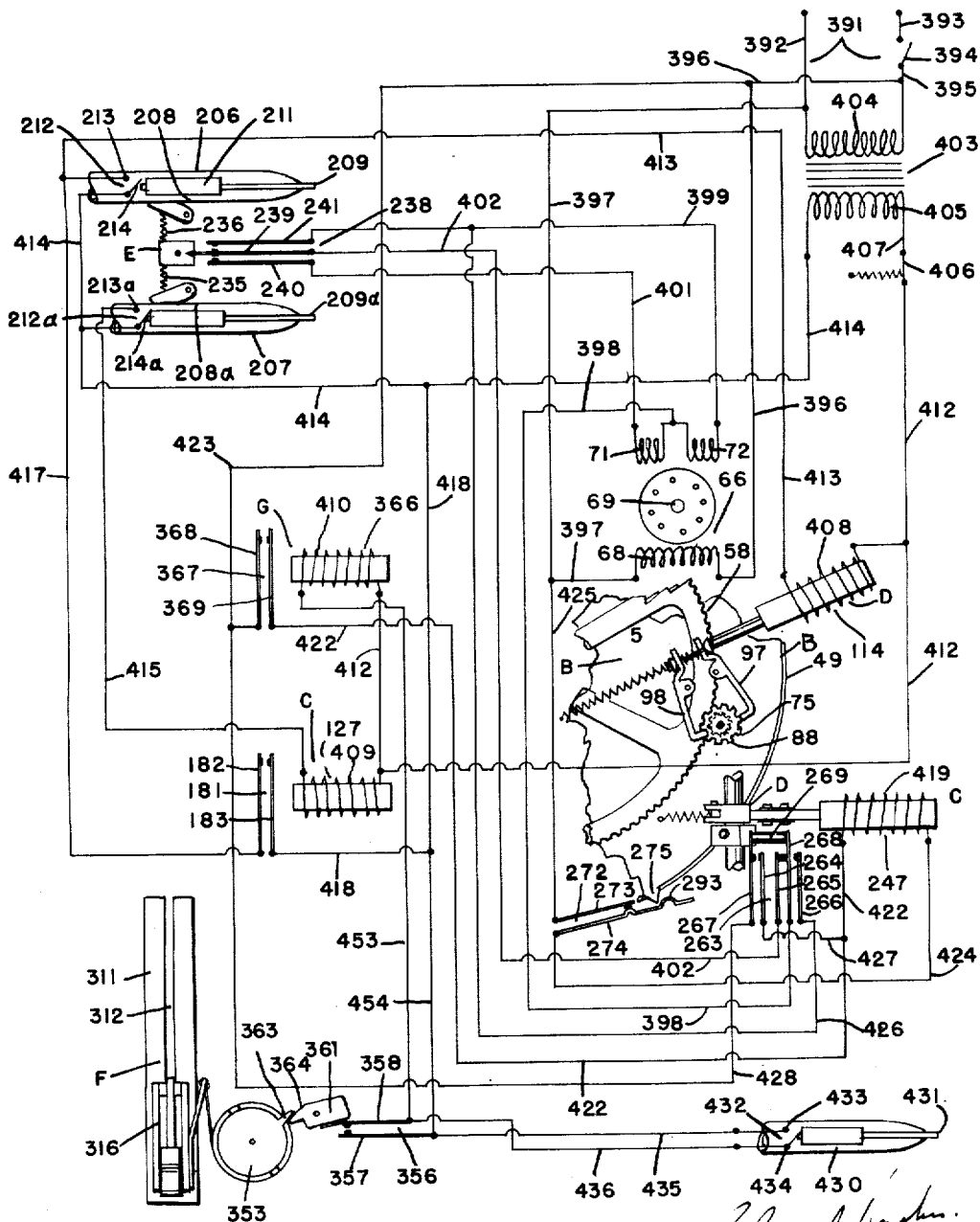
Fig. 14 is a wiring diagram of the invention.
Figure 16:
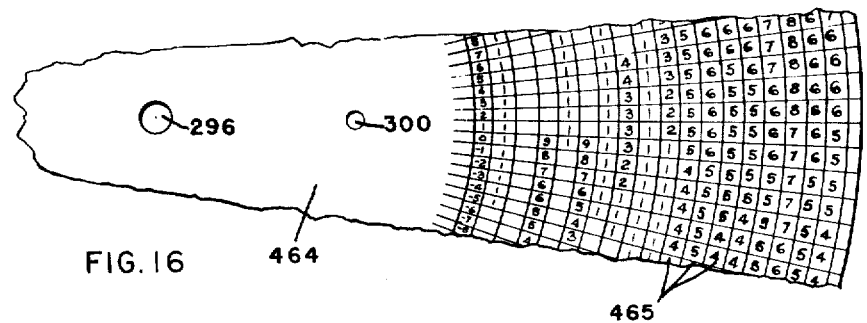
Fig. 16 is a view similar to Fig. 13 of another form of the record.

The resetting device D also includes a switch 272 shown in Figs. 2 and 14 having a fixed contact arm 273 and a movable contact arm 274. The arms 273 and 274 are mounted in a holder 291 secured to a bracket 292 and are insulated from each other and said holder. This bracket is attached to the plate 44 by means of screws 446 and 447 and underlies the rim. The switch 272 is normally closed and is adapted to be opened by means of a cam 275 attached to the lip 60 of the turn table 49 and which engages a cam follower 293 slidably mounted in a guide 290 mounted in bracket 292. This cam follower engages the movable contact arm 274 and when engaged by cam 275 opens switch 272.

The jaw clutch 91 is moved into disengaging position by means of a lever 276 which is pivoted on a pin 277 carried by the housing 76. The said lever is received in a slot 288 formed in said housing and is provided with an arm 289 engageable with the collar 95 on the sleeve 93 of the jaw clutch 91. The lower end of the lever 276 is fulcrumed on the stud 252 carried by the lever 253. When the electromagnet 247 is energized, shaft 254 is rotated through the action of lever 253 on which stud 252 is mounted and the jaw clutch 91 becomes disengaged.

Figure 15:
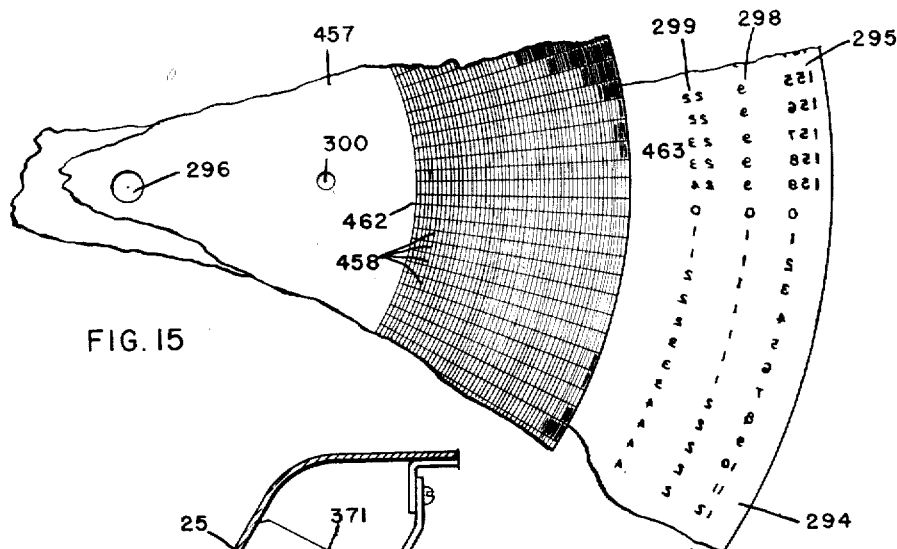
Fig. 15 is a plan view of one of the records used with the invention.

Mounted on the turn table 49 is a record 294 shown in detail in Fig. 15. On the record shown, an outer circumferential column of numerals indicated at 295 is employed which runs from 0 to 159 consecutively. All of the notations on the record are raised so that the same may be used for printing. The number of numerals in this column corresponds to the spaces the turn table is moved when actuated by means of the escapement 75. The turn table 49 is provided with the center 52 which passes through a hole 296 in the record at the center of the same. A drive pin 297 also secured to the table 49 outwardly of the center 296 passes through a corresponding hole 300 in the record and serves to drive the same. The column 295 on the record, when the apparatus is used for scoring, will indicate the raw score consisting of the number of right answers minus a certain percentage of the number of wrong answers. Where other systems of scoring are used other columns such as the columns 298 and 299 may be employed. The column 298 may be percentile scores while the column 299 may be standard scores. All of the notations in these columns are raised the same as those in column 295.

Figure 11:
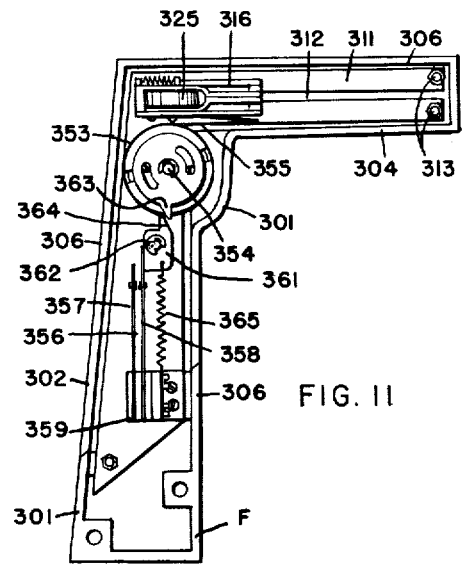
Fig. 11 is an inverted view of the printer of the invention detached from the case.
Figure 12:
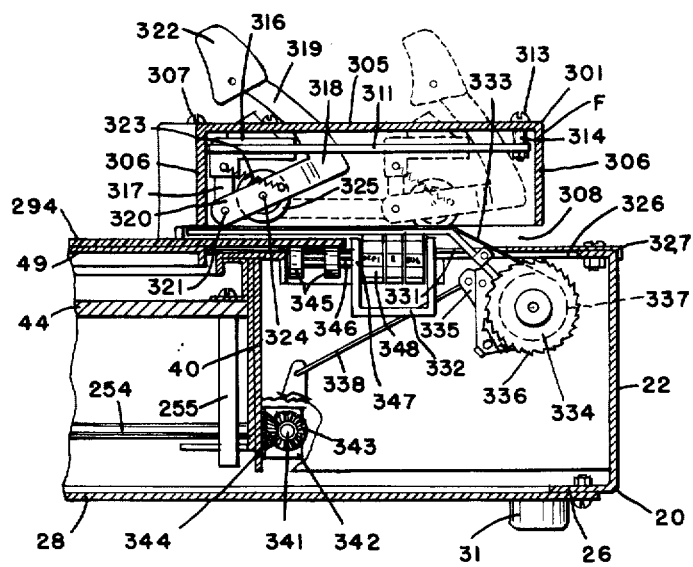
Fig. 12 is a sectional view taken on line 12—12 of Fig. 1.

The printer F is best shown in Figs. 1, 11 and 12. This printer consists of an L-shaped housing 301 having two angularly disposed legs 302 and 304. This housing comprises a top 305 and lateral walls 306 depending therefrom, the housing being open at the bottom. The housing 301 is attached to the top 21 of the case 20 by means of screws 307 which extend through the top 302 and are screwed into the top 21. The leg 304 and a portion of the leg 302 are raised above the top 21 for a purpose to be presently described to form a space 308 therebetween. In Fig. 1, a record 294 has been shown mounted on the turn table 49 and the marginal portion 309 of the same projects outwardly beyond the rim of said turn table. The space 308 extends sufficiently rearwardly on the leg 302 of housing 301 so that the record may travel freely below the same and so that the record may be conveniently removed from the turn table without injuring the same through contact with the housing. Mounted within the leg 304 of housing 301 is a guide 311 formed with a slot 312 extending along the same. This guide is attached to the top 305 by means of a number of screws 313 which pass through said top and guide. Spacers 314 mounted on said screws between the top 305 and the guide hold the guide in spaced relation to the said top. The top 305 is also formed with a slot 315 which registers with the slot 312 in the guide 311. Slidably mounted on the guide 311 is a slider 316 which has a lug 317 extending downwardly therefrom. Pivoted to this lug is an angle-shaped lever 318 which has one arm 319 projected outwardly through the slots 312 and 135 and another arm 320 pivoted to the lug 317 by means of a pintle 321. A knob 322 on the arm 319 serves to swing the lever downwardly and also to reciprocate said lever and the slider 116 along the guide 311. A tension coil spring 323 attached to the arm 320 and to the lug 317 normally holds the lever 318 in the position shown in Fig. 12. The arm 320 of lever 318 has attached to it a pintle 324 and on which is rotatably mounted a roller 325. This roller is constructed of a semi-hard material such as rubber or the like. The slot 315 and the roller 325 are disposed above the record 294 and in alignment with the axis of the center 52.

Formed in the top 21 of case 20 is an opening 326 which is adapted to be closed by means of a cover 327. This opening extends beneath the leg 304 of the housing 301 and also forwardly to give access to the interior of the case. A screw 328 extending loosely through a lug 329 on the cover 327 is screwed into the top 21 and holds the cover hingedly attached to the same. When the cover is in the position shown in Fig. 1 the opening 326 is covered. The cover 327 has a notch 331 in the same which leaves the space 308 beneath the leg 304 of the housing 301 in communication with the interior of the case 20. Extending through the notch 331 in cover 327 and into the space 308 between the housing 301 and the case 20 is a support 332 on which is mounted a typewriter ribbon 333. This ribbon extends above the record 294 and covers the marginal portion 309 thereof. Associated with the support 332 is a ribbon feed mechanism 334 which feeds the ribbon in a radial direction with reference to the record 294. The ribbon guide mechanism and the feed mechanism therefor being well known in the art, have not been described in detail, though any suitable device may be used for the purpose. The feed mechanism 334 is operated by means of a swinging arm 335 which has attached to it a pawl, not shown, and which operates a ratchet wheel 336 movable with one or the other of two spools 337 on which the ribbon 333 is wound. The arm 335 is operated by means of a link 338 which is pivoted to said arm and to another arm 339 fast on a countershaft 341. Shaft 341 is journaled in bearings 342 secured to the wall 40 and the partition 32. This shaft is driven through a beveled gear 343 secured thereto and which meshes with another beveled gear 344 fast on the shaft 254. The marginal portion 309 of record 294 is supported on two rollers 345 disposed beneath the same and which are mounted on a shaft 346. This shaft is journaled in a bearing 347 attached to the partition 32 and in another bearing not shown. Adjacent the edge of the record 249 is a dater 348 which may be of any desired type. This dater has three printing wheels 350, 351 and 352 which have raised numbers similar to the characters on the record 294 and which will simultaneously print on the answer sheet along with the raised numbers 295, 298 and 299 on the record. In operation, the answer sheet is inserted into the space 308 between the ribbon 333 and the lower edge of the housing 301. The lever 318 is moved downwardly by the knob 322 and after the roller 347 reaches the raised numerals on the record the lever 318 is advanced along the slots 315 and 312 to form an impression on the underside of the answer sheet. While no stops have been shown for positioning the answer sheet relative to the printer it will be readily understood that suitable adjustable stops may be used such as one now well known in the art.

The lever 318 is retracted to normal position by means of the following construction best shown in Fig. 11. A spring-biased drum 353 is mounted on a stud 354 extending downwardly from the top 305 of housing 301. This drum has attached to it and wound about the same a metal ribbon 355 which is attached at one end to said drum and at its other end to the slider 316. When the lever 318 is moved to the dotted line position shown in Fig. 12 the ribbon 355 is unreeled from the drum and the spring disposed within the drum tensioned. Upon release of the knob 322 the spring in the drum through the action of the ribbon 355 draws the slider back to its normal position as shown in full lines in Figs. 11 and 12.

Mounted within the leg 302 of the housing 301 is an electric switch 256 which has a fixed contact arm 357 and a movable contact arm 358. These arms are insulated from one another and attached to the housing 301 by means of a supporting structure 359. A pivoted cam follower 361 is rotatably mounted on a stud 362 attached to the top 305 of housing 301. This cam follower is adapted to be engaged by a cam 363 adjustably attached to the drum 353. The cam follower 361 has a cam surface 364 which, when the cam is moved in a counter clockwise direction, engages the arm 358 and moves it into contact with arm 357 thereby closing the switch 356. A tension coil spring 365 is connected at one end to the cam follower 363 and at its other end to the support 359. When the cam 363 rotates in a clockwise direction, cam surface 364 is engaged by the cam 363 on its other side and the cam follower is moved away from the contact arm 358. This causes the cam 361 to slip by the cam follower 361 and to occupy a position in which it may engage the surface 364 of said cam follower. When the drum 353 is rotated in the opposite direction said cam follower is also rotated in the opposite direction and the cam 363 caused to engaged the cam follower 361 to move the same against arm 358 to close switch 356.

The duplicator G has not been shown in detail. This duplicator is identically the same in construction as the divider C and the description thereof will not be repeated, the same reference numerals being used to designate the corresponding parts not specifically otherwise designated. This duplicator has an electromagnet 366 provided with a coil 410 and which operates a switch 367. Switch 367 has two switch contact arms 368 and 369 which are adapted to be closed when the electromagnet 366 is operated in the same manner as the electromagnet 127 of the divider C.

For indicating the total scores counted and for indicating the total papers marked, two totaling counters 371 and 372 are employed. Both of these counters are disposed within the case 20 and are attached to a plate 373 which in turn is attached to the offset 27 of said case. The windows of these counters are visible from the front of the case through suitable openings 374 and 375 in the front wall 25 thereof. These counters are arranged one above the other, counter 371 being uppermost. The counter 371 has a reset shaft to which is attached a knob 376 operable from the exterior. Likewise the counter 372 has a reset knob 377 accessible from the exterior of the case. Counter 371 has an operating shaft 378 to which is attached a beveled gear 379. Another beveled gear 381 is mounted on a counter shaft 382 journaled in a bearing 383 attached to a flange 469 on plate 373. Shaft 382 has secured to it by means of a coupling 384 a flexible shaft 386 which in turn is connected to the lower end of the shaft 85 of the counter B. As counter B gives to the turn table 49 a step by step movement, the total score will be indicated by the counter 371. The counter 372 has an operating shaft 385 which has mounted on it a depending arm 386. Arm 386 has attached to it a link 387 which in turn is secured to an arm 388 mounted on the shaft 254. A tension coil spring 389 mounted in the link 387 equalizes the pull on the counter 372 and causes the counter to move one step each time shaft 254 is operated. Shaft 254 being the control shaft of the resetting device, thus causes the total number of papers corrected to be indicated by the counter 377.

In the event that the slider 130 of the divider C occupies an intermediate position when the counter B is reset, the said divider is automatically reset by means of the following construction. Attached to the shaft 254 is an upstanding arm 448 which has pivoted to it one end of a link 449 similar to the link 387. The other end of this link is pivoted to the arm 201 of lever 199 of said divider which lever upon movement in a counter clockwise direction engages the lug 165 on lever 162 and swings said lever in a counter clockwise direction disengaging the finger 193 from shoulder 192 on arm 188 and raising dog 163 above the teeth 153 of the toothed member 154. In a similar manner the mechanism of the printer F may be reset by means of a link 451 connected to an arm 452 fast on the shaft 254 and to the arm 201 of the sequential action 120 of said printer.

If desired, the score may be manually marked on the answer sheet by means of a third control device 430. This control device is identically constructed with the control devices 206 and 207. This control device includes a lead 431 which operates a switch 432 having a fixed contact 433 and a movable contact 434. The construction and operation of this control device is the same as that of the previously referred to control devices.

The various elements of the apparatus are wired and connected together in the following manner: Current for operating the apparatus is derived from an A. C. line 391 having two conductors 392 and 393. A switch 394 is disposed in the conductor 393 and serves to energize the apparatus. This switch has connected to it a conductor 395. The main winding 68 of motor 66 is connected by means of a conductor 396 at one end to the conductor 395 of the line 391. The other end of this winding is connected by means of a conductor 397 to conductor 392 of the line. When the switch 394 is closed this winding of the motor is continuously energized. The two windings 71 and 72 are connected together and to a common conductor 398 which in turn is connected to the movable contact arm 268 of switch 263. The other end of the winding 72 is connected by means of a conductor 399 to the fixed contact arm 239 of switch 238. The other end of winding 71 is connected by means of a conductor 401 to the other fixed contact arm 240 of switch 238. The movable contact arm 241 of this switch is connected by means of a conductor 402 to the fixed contact arm 265 of switch 263. A number of the elements of the apparatus is operated by reduced voltage from a transformer 403. This transformer has a primary 404 and a secondary 405. The primary 404 of the transformer is connected to the conductor 392 of line 391 and to the conductor 395. One side of a normally closed switch 406 is connected by a conductor 407 to one side of the secondary 405. One end of each of the various coils 408, 409 and 410 of the electro- magnets 114, 127 and 366 are connected together by a conductor 412 which is connected to the other side of the switch 406. The other end of the coil 408 of electromagnet 114 is connected by means of a conductor 413 to the fixed contact arm 213 of switch 212 of the control device 206. The movable contact arm 214 of this control device is connected by means of a conductor 414 to the movable contact arm 214a of the control device 207 and also to the other end of the secondary 405 of transformer 403. The fixed contact arm 213a of the control device 207 is connected by means of a conductor 415 to the other side of the coil 409 of electromagnet 127. Fixed contact arm 213 of the control device 206 is further connected by means of a conductor 417 to the fixed contact arm 182 of switch 181. The movable contact arm 183 of this switch is connected by means of a conductor 418 to the conductor 414 which leads from one end of the transformer secondary 405. One end of the coil 419 of the electromagnet 247 is connected by means of a conductor 422 to the movable contact arm 369 of switch 367. The fixed contact arm 368 of this switch is connected by means of a conductor 423 to the conductor 396 of line 391. The other end of the coil 419 is connected by means of a conductor 424 to the movable contact arm 274 of switch 272. The fixed contact arm 273 of this switch is connected by means of a conductor 425 to the conductor 397 previously referred to. The fixed contact arm 266 of switch 263 is connected by means of a conductor 426 to the conductor 399 which as previously described is connected to the fixed contact 239 of switch 238. The fixed contact arm 264 of switch 263 is connected by means of conductor 427 to the conductor 422. The movable contact arm 267 of switch 263 is connected by means of conductor 428 to the conductor 423 which in turn is connected to the conductor 395. The fixed contact arm 433 of control device 430 is connected by means of a conductor 435 to the contact arm 357 of switch 356. The movable contact arm 434 of this switch is connected by means of a conductor 436 with the movable contact 358 of switch 356. This contact arm is further connected by means of a conductor 453 with one end of coil 410 of electromagnet 366. The fixed contact arm 357 of switch 356 is connected by means of a conductor 454 with the conductor 418.

The operation of the method and apparatus of the instant invention is as follows:

The operator first places the proper record 294 on the turntable 49. The knob 170 of the divider C is then set to the proper number of wrong answers for which a deductable unit is to be taken from the right answers. Upon closing the switch 394 the primary 404 of transformer 403 is energized; likewise the winding 68 of motor 66. The circuit for the motor 66 may be traced starting with the conductor 395 of the line 391 through the conductor 396 to one side of the winding 68. The circuit may further be traced from the other side of the winding through the conductor 397 and back to the conductor 392 on the other side of the line 391. The two shading windings 71 and 72 being connected to the switch 238 are both disconnected since in normal position the circuits through this switch are both open. All the parts are now at rest and in the positions shown in Fig. 14. The operator next takes an answer sheet such as the sheet 437 and inserts it between the back 442 and the front 443 of the appropriate folder A. The front 443 of this folder is provided with the proper apertures 445 which lie opposite the spaces 438 for the proper answers when the answer sheet is brought into proper position. The operator then removes the pencil 206 used for noting correct answers from its sheath 224. Immediately upon removal of this pencil the lever 233 is disengaged from the pencil and the pressure on the spring 236 relieved. This permits spring 235 to overcome spring 236 and the lever 233 engaging the contact arm 241 shifts said arm until the same makes contact with the contact arm 240. The circuit can now be traced as follows: Commencing with arm 241 the circuit is established through conductor 402 through the contact arms 265 and 268 of switch 263, through conductor 398, through the winding 71 and through the conductor 401 back to the arm 240. Shading winding 71 is now short-circuited and functions in the normal manner to cause rotation of the turn table 49 in a forward direction. However, the escapement 75 in normal position restrains rotation of pinion 92 and the gear 58 holds the turn table 49 from rotation. The operator then scans the answer sheet through the apertures 445 in the front 443 of the folder A and as soon as he comes to an aperture showing a student's mark for a correct answer he uses the pencil and presses the lead 209 on the paper through the aperture and makes a mark indicating that the answer is a correct answer. A pencil having a different color or making a mark differentiating in any other way from the mark made by the student is preferably used so that the marks of the student may be distinguished from the marks of the person correcting the paper. Applying pressure on the lead 209 of pencil 206 closes switch 212. A circuit can now be traced as follows: Commencing with the secondary 405 of transformer 403, current flows from the conductor 407 through the normally closed switch 406 through conductor 412 and to the coil 408 of electromagnet 114. From this coil current flows through conductor 413 to the contact 213 of switch 212, through the movable contact 214 thereof, through conductor 414 back to the other side of the secondary 405 of transformer 403. The electromagnet 114 is now energized and the escapement 75 operated. This causes the ratched wheel 336 to move one tooth and the counter to count one. The operator then follows along the answer sheet and the next space having a correct answer visible through the proper aperture is similarly marked. This causes the escapement 75 to again operate and to move the counter another space and cause the counter to count two. The operator then goes through the entire sheet and marks all the correct answers, the count being kept by the counting member or turn table 49. After all the correct answers have been counted, the pencil 206 is replaced in the sheath 224 and the pencil 207 withdrawn from its sheath 225. Cam 245 on lever 230 now becomes disengaged from the pencil and the spring 236 overpowers the spring 235 causing lever 230 to swing in a manner to bring the movable switch arm 241 of switch 238 in contact with contact arm 239. The following circuit may now be traced: Commencing with contact arm 241, the circuit is completed through conductor 402, through the contact arms 265 and 268 of switch 263, through conductor 398, through the shading windings 72 and back to the arm 239 through conductor 399. The winding 72 is now shorted and the motor 66 tends to urge rotation in the reverse direction. The operator then goes back over the answer sheet and in all the spaces visible through the apertures and where no student mark occurs, a mark is made indicating that the answer given by the student is wrong. The lead 209*a* of pencil 207 may be of a different color than that of the lead 209 of pencil 206 so as to differentiate between right and wrong answers. The lead may also be of a different color from that used by the student to differentiate between the student's mark and those of the person marking the answer sheet. As soon as the lead 209*a* is pressed inwardly to make a mark, switch 212*a* is closed. A circuit may now be traced through this switch. Commencing with the conductor 407 of the secondary 405 of transformer 403 current flows through the switch 406, conductor 412 and to the coil 409 of electromagnet 127 forming a part of the divider C. Current flows from the other side of this coil through a conductor 415 and to the fixed contact 213*a* of switch 212*a*. Current further flows through the movable contact 214*a* of this switch through conductor 414 and back to the other side of the secondary 405 of transformer 403. The tooth member 135 is now given one step of movement.

Assumed that the knob 170 is set to 4. The operator then keeps on similarly marking wrong answers and when the tooth member 135 has been moved four spaces switch 181 is closed and the following circuit completed: Commencing with the conductor 414 connected to the secondary 405 of transformer 403, current flows through the conductor 418, the contact arm 183, the contact arm 182, through conductor 417, through conductor 413 and from this conductor to one end of the coil 408 of electromagnet 114 of the counter B. Current flows from the other end of said coil through conductor 412, switch 406 and conductor 407 to the other side of the secondary 405 of transformer 403. The escapement 75 is again operated. However, the motor 66 is urged to rotate in the reverse direction and the turn table 49 is moved backward one space. As the operator continues to mark, the divider C repeats its functions, and every time four wrong answers have been noted turn table 49 is moved back another space. After all of the answers have been marked the answer sheet is removed from the folder A and inserted between the printer F and the ribbon 333. Knob 322 on lever 319 of the printer is next moved toward the right as viewed in Fig. 12 and the roller 325 caused to travel across the radial row of raised numbers formed on the record 294. Ribbon 333 causes an impression to be made on the paper and the score is printed on the answer sheet at a location determined by the proper positioning of the sheet with reference to the printer. During such a movement switch 256 is closed when the said knob reaches the end of the stroke. The following circuit may now be traced: Commencing with the conductor 414, current flows through the conductor 418 and to the arm 357 of said switch. Current passes through the arm 358, through the conductor 453 and to one end of the coil 410 of electro magnet 366 of printer F. Current then flows from the other end of this coil through conductor 412 and switch 406 and conductor 407 back to the other side of the secondary 405 of transformer 403. The knob 322 of printer F is set for as many copies as desired. If the score is to be printed on several different sheets, the sheets are removed as printed and the fresh sheets inserted. The knob is then again moved toward the right to print the identical numbers on each successive sheet. When the last sheet has been printed the duplicator G closes switch 367. The following circuit may now be traced: Commencing with the conductor 393 forming one side of the line 391, current flows through switch 394, conductor 395, conductor 396, conductor 423 and to the contact arm 368 of said switch. Current then flows from the other contact arm 369 through conductor 422 and to one side of the coil 419 of electromagnet 247. The current then flows through this coil, through conductor 424, through switch 272, through conductor 425 and through conductor 397 back to conductor 392 forming the other side of the line 391. The electromagnet 247 is now energized and the switch 263 actuated. The circuit through the contact arms 268 and 265 and the circuit operated by 241 and 240 of switch 238 and which control the forward movement of the motor 66, is now opened. A holding circuit is however established through the contact arms 264 and 267 of switch 263. This holding circuit parallels the switch 367 and maintains the coil 419 of relay 247 temporarily energized. The actuation of switch 263 completes the circuit through the contact arms 268 and 266 which may be traced as follows: Commencing with arm 266, a circuit is established through conductor 426, through conductor 399, through the shading windings 72 of motor 66, through conductor 398 and back to contact arm 268. This shorts the windings 72 and motor 66 is energized to urge rotational movement in the reverse direction. Actuation of the electromagnet 247 causes the clutch 91 to become disengaged and motor 66 now operates in a reverse direction rotating the turn table 49 in a reverse direction to reset the same. Cam 275 on turn table 49 when said turn table reaches zero position engages the cam follower 293 and opens switch 272 to deenergize the winding 419. The apparatus has now been reset and is ready for the processing of another answer sheet.

In the event that it becomes desirable to mark the score on the answer sheet manually, the same may be accomplished by means of the control device 430. The lead 431 is used for marking and operates switch 432 the same as the control devices 206 and 207. This switch is in parallel with switch 356 of printer F and performs the same function. The knob 170 of the duplicator is set for the number of copies and the marking of the last copy resets the apparatus to normal.

At times it becomes desirable to provide a distribution graph showing the number of students receiving each of the various scores for the purpose of studying the suitability of the questions for the test in which they are given. For this purpose a disc 457 which has spaces 458 on it arranged in circular columns and radial rows corresponding with the score numbers on the record 294 and disposed inwardly thereof. The rows of spaces 458 are visible through a radial slot 459 formed in a cover 461 covering a portion of the disc 457. This cover is pivoted on a stud 467 attached to housing 301 and rests on a pin 468 also carried by said housing. Cover 461 may thus be raised to facilitate placing of the record on the turn table 49. When this graph is to be made the knob 170 of duplicator G is set for one more than the number of copies to be printed. After the last copy has been printed the pencil 430 is used and a mark made through the slot 459 and in the last unmarked space 458 nearest the starting circle. Either of the circles 462 or 463 bounding the columns of spaces may be used as a starting line. As soon as the mark is made the apparatus becomes reset. While the mark is being made the record 294 is momentarily manually held from movement. Where battery tests are being given and the student tested on a number of subjects a record such as shown in Fig. 15 and indicated by the reference numeral 464 may be used. This record has circular columns 465 of scores, there being one row for each position of the turn table. These rows are radially arranged and are visible through the slot 459 of cover 461. In such case the scores for the various subjects are directly read from the record and manually written on the answer sheet with the pencil 430. This permits of using different scoring methods with each subject tested and speeds up the scoring task.

Throughout the operation of the apparatus the counters 371 and 372 are being actuated. Counter 371 totals the score of each paper while counter 372 totals the number of tests scored. These counters must be manually reset, counter 371 at the completion of the scoring of each test and counter 372 at the completion of the group of tests. Knobs 376 and 377 are used for this purpose. The divider C can be manually reset by pressing inwardly on the knob 170. Head 177 on the end of shaft 168 swings arm 201 to procure engagement with lug 165 and the swinging of lever 162 to retract dog 163 from ratchet teeth 155. Spring 157 now moves the slider 130 back to normal position. Similarly the entire apparatus may be reset by pressing inwardly on the knob 170 of the printer F.

The advantages of the invention are manifest. The method and apparatus operate to reduce error caused by human fatigue and permits continuous operation. Practically no skill is required in the scoring of the tests by the use of the method and apparatus. The user has practically nothing to remember and when the printer is used nothing to write. The operation of the apparatus does not depend upon the kind of mark made by the student nor upon the density of the mark. The marking of several answers to one question is readily detected. The apparatus uses only mechanical and electrical elements which are positive in action thereby preventing erroneous scoring of the answer sheets due to failure of the apparatus to respond to the student's marks on the answer sheet. The apparatus can be manufactured at an economical cost and will require a minimum amount of servicing. The method can be used independently of the apparatus and with other apparatuses if desired.

Changes in the specific form of the apparatus and in the steps of the method may be made within the scope of what is claimed without departing from the spirit of the invention.

Having described the invention what is claimed as new and desired to be protected by Letters Patent is:

1. In test scoring apparatus, a counter including a movable counting member movable in steps in forward and reverse directions, a first control device connected to said counter and upon each actuation giving to said member one step of movement in the forward direction, a divider including a movable member movable in steps, a second control device connected thereto and upon each actuation giving to the movable member of the divider one step of movement in one direction, actuating means acting between the movable member of said divider and the movable counting member of the counter and when the movable member of the divider has been actuated a predetermined number of times giving to the movable counting member of the counter one step of movement in the reverse direction.

2. In test scoring apparatus, a counter including a movable counting member movable in steps in forward and reverse directions, a first control device connected to said counter and upon each actuation giving to said member one step of movement in the forward direction, a divider including a movable member movable in steps, a second control device connected thereto and upon each actuation giving to the movable member of the divider one step of movement in one direction, actuating means acting between the movable member of said divider and the movable counting member of the counter and when the movable member of the divider has been actuated a predetermined number of times giving to the movable counting member of the counter one step of movement in the reverse direction and adjusting means acting upon the movable member of said divider and limiting the movement thereof to vary the number of operations thereof required to procure one step of movement of the movable counting member of the counter in the reverse direction.

3. In test scoring apparatus a counter including a rotatable counting member guided for rotational movement in forward and reverse directions, motive means connected to said rotatable member and urging movement of said rotatable member in either direction, controlling means connected to and controlling the operation of said motive means to compel movement of the rotatable member in a particular direction, an escapement acting on a part movable with said movable member and giving to said rotatable member a step by step movement in either direction, a first control device connected to the escapement and procuring upon each actuation one step of movement in the forward direction, a divider including a movable member movable in steps, a second control device connected to said divider and upon each actuation thereof giving to the movable member of said divider one step of movement, actuating means acting between the movable member of said divider and said escapement and operable by the movable member of the divider after the same has been given a predetermined number of steps of movement to actuate said escapement and procure one step of movement of the movable counting member in the reverse direction and a selector connected to said controlling means of the motive means and determining the direction in which the movable counting member is moved.

4. In test scoring apparatus a counter including a turn table guided for rotational movement, a reversible electric motor, a power transmission between said motor and turn table, circuits connected to said motor and causing said motor to urge movement of the turn table in opposite directions, an escapement connected to said turn table and restraining rotation thereof, said escapement upon operation releasing said turn table for step by step movement in either direction, an electromagnet having a movable core piece connected to said escapement and upon each energization thereof operating said escapement to procure one step of movement of the turn table, in a direction depending upon the energization of said electric motor a circuit for energizing said electromagnet, a control device including a manually operated switch connected in the circuit for energizing the electromagnet, a divider including a movable member movable in steps, a second electromagnet having a movable core piece connected to the movable member of said divider and upon each energization thereof giving to the movable member of the divider one step of movement, actuating means acting between the movable member of said divider and said escapement and operable by the movable member of the divider after the same has been given a predetermined number of steps of movement to actuate said escapement and procure movement of said turn table in the reverse direction, a circuit for energizing said second electromagnet, a second control device including a manually operated switch connected in said last named circuit, and a selector switch mechanism connected in said motor circuits and controlling the direction of movement of said motor.

5. In test scoring apparatus a counter including a turn table guided for rotational movement, a reversible electric motor, a power transmission between said motor and turn table, circuits connected to said motor and causing said motor to urge movement of the turn table in opposite directions, an escapement connected to said turn table and restraining rotation thereof, said escapement upon operation releasing said turn table for step by step movement in either direction, an electromagnet having a movable core piece connected to said escapement and upon each energization thereof operating said escapement to procure one step of movement of the turn table, in a direction depending upon the energization of said electric motor a circuit for energizing said electromagnet, a control device including a manually operated switch connected in the circuit for energizing the electromagnet, a divider including a movable member movable in steps, a second electromagnet having a movable core piece connected to the movable member of said divider and upon each energization thereof giving to the movable member of the divider one step of movement, actuating means acting between the movable member of said divider and said escapement and operable by the movable member of the divider after the same has been given a predetermined number of steps of movement to actuate said escapement and procure movement of said turn table in the reverse direction, a circuit for energizing said second electromagnet, a second control device including a manually operated switch connected in said last named circuit, a selector switch mechanism connected in said motor circuits and controlling the direction of movement of said motor and means engageable with said control devices and operating said selector switch mechanism to procure forward movement of the turn table when said first control device is in operation and reverse movement thereof when said second control device is in operation.

6. In test scoring apparatus a counter including a turn table guided for rotational movement, a reversible electric motor, a power transmission between said motor and turn table, circuits connected to said motor and causing said motor to urge movement of the turn table in opposite directions, an escapement connected to said turn table and restraining rotation thereof, said escapement upon operation releasing said turn table for step by step movement in either direction, an electromagnet having a movable core piece connected to said escapement and upon each energization thereof operating said escapement to procure one step of movement of the turn table, in a direction depending upon the energization of said electric motor a circuit for energizing said electromagnet, a control device in the form of a pencil including a manually operated switch connected in the circuit for energizing the electromagnet, a divider including a movable member movable in steps, a second electromagnet having a movable core piece connected to the movable member of said divider and upon each energization thereof giving to the movable member of the divider one step of movement, actuating means acting between the movable member of said divider and said escapement and operable by the movable member of the divider after the same has been given a predetermined number of steps of movement to actuate said escapement and procure movement of said turn table in the reverse direction, a circuit for energizing said second electromagnet, a second control device similar to said first control device and including a manually operated switch connected in said last named circuit, juxtaposed sheaths for the reception of said control devices, a selector switch mechanism disposed adjacent said sheaths and connected in said motor circuits and controlling the direction of movement of said motor, said switch mechanism having parts accessible from within said sheaths and engageable with said control devices, said first named control device when in its sheath energizing said motor to impel movement in one direction when the second named control device is actuated, and said second named control device when in its sheath energizing said motor to impel movement in the opposite direction when the first named control device is actuated.

7. In test scoring apparatus a counter including a turn table guided for rotational movement, a reversible electric motor, a power transmission between said motor and turn table, circuits connected to said motor and causing said motor to urge movement of the turn table in opposite directions, an escapement connected to said turn table and restraining rotation thereof, said escapement upon operation releasing said turn table for step by step movement in either direction, an electromagnet having a movable core piece connected to said escapement and upon each energization thereof operating said escapement to procure one step of movement of the turn table, in a direction depending upon the energization of said electric motor a circuit for energizing said electromagnet, a control device including a manually operated switch connected in the circuit for energizing the electromagnet, a divider including a movable member movable in steps, a second electromagnet having a movable core piece connected to the movable member of said divider and upon each energization thereof giving to the movable member of the divider one step of movement, actuating means acting between the movable member of said divider and said escapement and operable by the movable member of the divider after the same has been given a predetermined number of steps of movement to actuate said escapement and procure movement of said turn table in the reverse direction, a circuit for energizing said second electromagnet, a second control device including a manually operated switch connected in said last named circuit, a selector switch mechanism connected in said motor circuits and controlling the direction of movement of said motor, sheaths for the reception of said control devices, levers having arms extending into said sheaths and engageable with said control devices means operable by said levers and acting on said selector switch mechanism to procure forward movement of the turn table when one of the control devices is removed from its sheath and reverse movement when the other control device is removed from its sheath.

8. In test scoring apparatus a counter including a turn table guided for rotational movement in steps in forward and reverse directions, a first control device connected to said counter and upon actuation giving to said turn table one step of movement in the forward direction, a second control device, means acting between said second control device and said counter and giving to said turn table one step of movement in the reverse direction upon a predetermined number of actuations thereof, a record on said table having type thereon capable of printing and designating the score at each position of the turn table, a printer mounted in juxtaposition with reference to the type on said record, said printer having a movable member adapted upon movement to print from said type to an answer sheet positioned between said printer and record, and resetting means operated by said movable member and said counter and resetting said turntable upon a predetermined number of actuations of the movable member of said printer.

9. In test scoring apparatus a counter including a turn table guided for rotational movement in steps in forward and reverse directions, a first control device connected to said counter and upon actuation giving to said turn table one step of movement in the forward direction, a second control device, means acting between said second control device and said counter and giving to said turn table one step of movement in the reverse direction upon a predetermined number of actuations thereof, a record on said table having type thereon capable of printing and designating the score at each position of the turn table, a printer mounted in juxtaposition with reference to the type on said record, said printer having a movable member adapted upon movement to print from said type to an answer sheet positioned between said printer and record, a sequential action having a movable member movable in steps, means acting between said movable member of said printer and upon each actuation thereof giving to the movable member of the sequential action one step of movement and resetting means operated by said sequential action and connected to said counter, said means acting to reset the counter upon actuation thereof a predetermined number of times.

10. In a sequential action a frame, guide means carried by said frame, a first tooth member slidable along said guide means and formed with spaced teeth a first lever pivoted to said frame to one side of said tooth member and having an arm extending toward said tooth member and movable in the direction of movement of said tooth member, a second lever pivoted to said arm, a pawl carried by said arm and engageable with any of the teeth of said first tooth member and adapted upon swinging of said first lever to move said tooth member toward said first lever resilient means acting between said second lever and arm and urging said pawl into engagement with said teeth, resilient means acting between said tooth member and frame and urging said tooth member for movement away from said first lever, resilient means acting between said first lever and frame and urging said first lever toward said tooth member, a second tooth member movable with said first tooth member and having teeth corresponding to the teeth of said first tooth member, a dog pivoted to said frame and engageable with the teeth of said second tooth member and holding said tooth members in shifted positions, a stop carried by said case, means forming an abutment on said second lever located between the pivot thereof and said first tooth member, and urging said pawl out of engagement with the teeth of said first tooth member when said first lever is moved to normal position, actuating means connected to said first lever and operating means connected to said first tooth member and means connected to said dog and releasing said dog from said second tooth member upon movement of said first tooth member to one end of its path of movement.

11. In a sequential action a frame guide means carried by said frame, a control member guided by said guide means and movable in opposite directions, resilient means engaging said control member and urging movement thereof in one direction, an actuating member guided for movement in the same direction as said control member, drive means acting between said control member and said actuating member and causing one step of movement of said control member upon each actuation thereof, and in opposition to the action of said resilient means, checking means connected to said control member and restraining movement thereof in the opposite direction, release means operated by said actuating means and rendering said drive means inoperative at the beginning of its driving motion, release means actuated by said control member and rendering said checking means inoperative at the end of the movement of said control means in the first named direction to cause said resilient means to reset the control means and means for performing a function operated by said control member when it reaches its extreme position and before operation of said second release means.

12. In a sequential action a frame guide means carried by said frame, a control member guided by said guide means and movable in opposite directions, resilient means engaging said control member and urging movement thereof in one direction, an actuating member guided for movement in the same direction as said control member, drive means acting between said control member and said actuating member and causing one step of movement of said control member upon each actuation thereof, and in opposition to the action of said resilient means, checking means connected to said control member and restraining movement thereof in the opposite direction, release means operated by said actuating means and rendering said drive means inoperative at the beginning of its driving motion, release means actuated by said control member and rendering said checking means inoperative at the end of the movement of said control means in the first named direction to cause said resilient means to reset the control means and means for performing a function operated by said control member when it reaches its extreme position and before operation of said second release means, and manual means acting on said second named release means and operating the same to release said control member prior to its arrival at its extreme position.

13. In a sequential action a frame guide means carried by said frame, a control member guided by said guide means and movable in opposite directions, resilient means engaging said control member and urging movement thereof in one direction, an actuating member guided for movement in the same direction as said control member, drive means acting between said control member and said actuating member and causing one step of movement of said control member upon each actuation thereof, and in opposition to the action of said resilient means, checking means connected to said control member and restraining movement thereof in the opposite direction, release means operated by said actuating means and rendering said drive means inoperative at the beginning of its driving motion, release means actuated by said control member and rendering said checking means inoperative at the end of the movement of said control means in the first named direction to cause said resilient means to reset the control means and means for performing a function operated by said control member when it reaches its extreme position and before operation of said second release means, and an adjustable stop to limit the extent of return movement of said control member occasioned by said resilient means.

No references cited.